Figure 1:
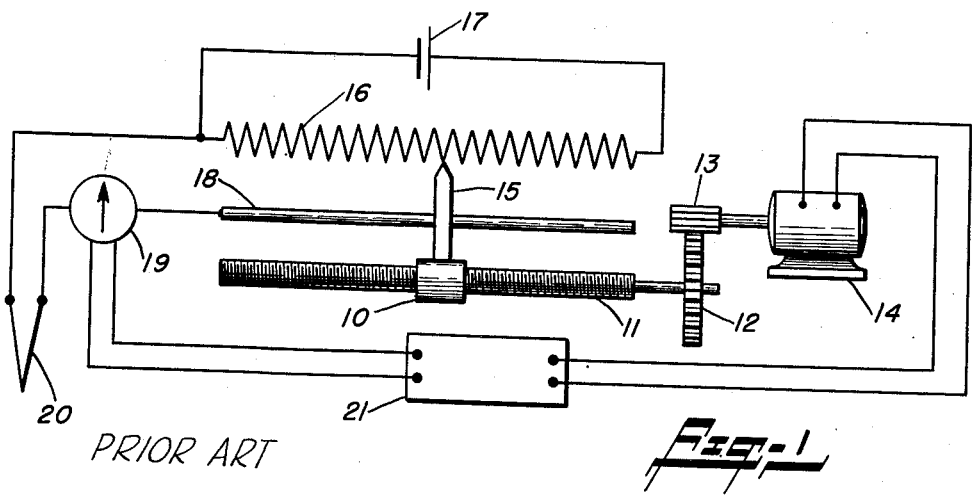

June 1, 1954  R. W. GILBERT  2,680,221
DAMPING GENERATOR FOR SLIDE WIRE POTENTIOMETERS
Filed Feb. 19, 1951

ROSWELL W. GILBERT
INVENTOR.

BY
*Gaylor, Cifelli & Jurick*
ATTORNEYS

Patented June 1, 1954

2,680,221

UNITED STATES PATENT OFFICE 2,680,221

DAMPING GENERATOR FOR SLIDE WIRE POTENTIOMETERS

Roswell W. Gilbert, Montclair, N. J., assignor to Weston Electrical Instrument Corporation, Newark, N. J., a corporation of New Jersey Application February 19, 1951, Serial No. 211,773

2 Claims. (Cl. 318—28)

This invention relates to automatic, self-balancing recorders and/or controllers of the potentiometric class and more particularly to a novel and simple arrangement for providing derivative damping to prevent overshooting and/or hunting of the potentiometric balancing system.

Recorders and automatic control systems of the potentiometric class contemplated by this invention respond to mechanical, chemical, electrical or other physical changes of a condition in order to effect a record of the changes, or to maintain predetermined physical conditions at controlled points. The self-balancing arrangement includes a contact engaging a resistance included in a sensitive measuring circuit, such contact being automatically adjusted along the resistance, under the control of a galvanometer or the like, to balance the E. M. F. of a thermocouple, or other potential being measured, against the potential drop in a portion of the measuring circuit that includes more or less of said resistance. Inasmuch as the sliding contact and the associated source of mechanical power, gearing, etc., includes some mass a system of this type is likely to hunt about the balance point before a true static balance is obtained. Numerous proposals have been advanced to overcome such hunting without significantly affecting the speed of response of the apparatus to a change in the condition being measured or controlled. Such prior devices, while satisfactory in a practical sense, are costly and cumbersome.

An object of this invention is the provision of a simple arrangement for damping the movable mechanism of slide-wire potentiometers.

An object of this invention is the provision of a damping device for use on slide wire recorders, controllers, and the like, which device provides a damping function related to the velocity of movement of the slidable element.

An object of this invention is the provision of damping arrangement for slide wire recorders and controllers, which arrangement comprises the provision of a D.-C. magnetic field having a length substantially coextensive with the length of travel of the slidable member, and a coil attached to the slidable member and movable in such magnetic field, said coil connected into the electrical measuring or balancing circuit.

An object of this invention is the provision of a damping arrangement for slide wire, self-balancing potentiometers, which arrangement comprises a permanent magnet, spaced pole pieces contacting the polar ends of the magnet and extending along the slide wire mechanism, and a coil attached to the slidable member of the mechanism, said coil encircling one of the pole pieces and connected between the slider and the associated resistance of the slide wire mechanism.

These and other objects and advantages will be apparent from the following description when taken with the accompanying drawings. The drawings are for purposes of illustration and are not to be construed as defining the scope or limits of the invention, reference being had for the latter purpose to the appended claims.

Figure 2:
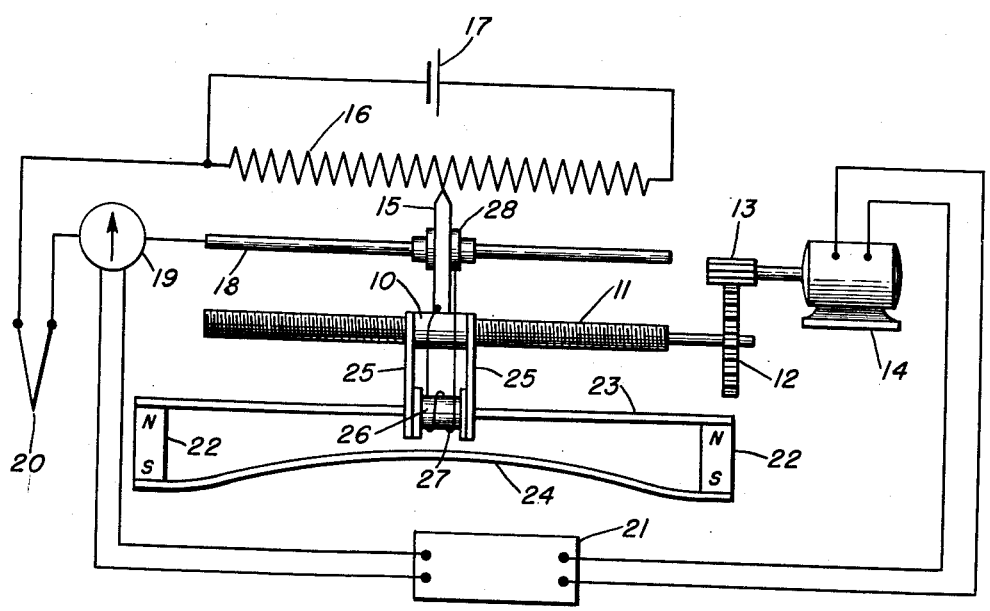

In the drawings wherein like reference characters denote like parts in the several views:

Figure 1 is a more or less diagrammatic showing of the essential elements of a conventional self-balancing potentiometer required for an understanding of my invention; and Figure 2 is a similar representation illustrating my invention.

Referring now to Figure 1, the slider 10 travels upon a screw-threaded shaft 11 which is driven through the gears 12, 13 by a reversible motor 14. The slider carries a contact 15 which engages the resistance 16 that is connected across a source of constant current 17. This slider is also in electrical contact with a bar 18 that is connected to the sensitive galvanometer 19. As shown in the drawing, the sensing element may comprise a thermocouple 20 connected between the galvanometer and one end of the resistance 16. It will be apparent that the potential generated by the thermocouple can be balanced by the potential drop across the contact 15 and the common end of the resistance 16. When these potentials are equal, and opposite, no voltage will appear across the galvanometer. Upon a change in the potential generated by the thermocouple the galvanometer deflections to one side or the other of its zero position and such voltage unbalance operates a directionally-responsive amplifier 21 that impresses a proportional voltage across the motor 14 to cause proper rotation of the shaft 11 until a new balance point is obtained. Those skilled in this art will known that the slider 10 may be associated with a pen to trace a record on a recorder chart and that suitable control mechanism may be associated with the slider and/or galvanometer, whereby such unbalance in the electrical circuit produces a corresponding control or corrective action to maintain or restore the condition sensed by the thermocouple.

To prevent overshooting of the slider as it moves to a new balance point relative to the resistance 16 I employ a coil cutting through a magnetic flux field whereby movement of the slider generates a potential in such coil. Such potential, having a magnitude related to the velocity of the slider linearly along the shaft 11, is impressed upon the electrical circuit so as to oppose the difference in potential between the sensing device and the bucking potential developed across the resistance 16.

Reference is now made to Figure 2. A pair of permanent magnets 22 are spaced from the shaft 11, said magnets having their like polar ends joined by the soft-iron pole pieces 23, 24. It will be apparent a constant magnetic flux field is developed between the two pole pieces. Although establishment of a uniform flux distribution along such pole pieces is not essential to the practice of my invention, such uniformity may be achieved by bending the pole piece 24, as shown. The slider 10 has secured thereto suitable supports 25 which carry a hollow form 26 upon which is wound a coil 27. The supports 25 are provided with aligned openings so that such supports and the coil-supporting form may slide freely over the pole piece 23. It will be apparent movement of the slider, in response to rotation of the threaded shaft 11, causes the coil 27 to cut the lines of flux between the two pole pieces, thereby generating a potential, in the coil, that is proportional to the velocity of the coil. The coil has one end connected to the contact 15 that engages the resistance 16. Such contact is now electrically insulated from the rod 18 by any suitable means, and the other end of the coil is maintained in contact with the rod as by the collar 28, such collar, of course, being insulated from the contact 15. Effectively, then, the coil 27 is connected between the resistance 16 and the galvanometer. The direction of the magnetic flux across the pole pieces, the direction of the coil 27 turns around the pole piece 23, and the connection of the coil ends to the contact 15 and the collar 28, are such that the potential generated in such coil satisfies the equation, $$e_t + E + e_c = 0$$

where $e_t$ is the potential generated by the thermocouple, or other sensing element;

$E$ is the potential drop across the resistance 16 which is impressed upon the measuring circuit; and $e_c$ is the potential generated in the coil 27.

It will be noted that when the slider is stationary (when the system is balanced electrically) there is no potential generated in the damping coil 27. When the voltage of the sensing element varies substantially from such balance point the slider moves at maximum velocity toward the new balance point to be established across the slide wire resistance. Such maximum velocity of the coil 27 generates a maximum potential in the damping coil. Since this potential is opposed to that of the sensing element the potential difference across the galvanometer is decreased with a resulting decrease in the voltage applied to the driving motor 14 through the directionally-responsive voltage-proportioning device 21. The resulting reduction in the rotational speed of the driving motor produces a decreased linear velocity of the slider and damping coil and, correspondingly, the potential generated in the damping coil is reduced. Thus, it is apparent an unbalance in the electrical circuit results in a slider movement of high, initial velocity and such velocity decreases progressively until the new balance point is reached.

Although I have described my invention with specific reference to a slide wire potentiometer those skilled in this art will have no difficulty in applying the invention to other devices and apparatus such as servo systems, wherein a damping or bucking potential proportional to the velocity of a movable member may be used to advantage.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. In a self-balancing instrument of the class comprising a potentiometer including a fixed resistor connected to a source of constant voltage and a slider engaging the resistor, said slider and one end of the resistor constituting the output circuit of the potentiometer, a variable voltage source connected to the potentiometer output circuit, and means responsive to a voltage unbalance between the variable voltage source and the potentiometer output to move the slider in one direction or the other to thereby establish a voltage balance; a pair of spaced permanent magnets, an elongated soft-iron pole piece spaced from the fixed resistor and connected to like poles of the magnets, a second elongated soft-iron pole piece spaced from the first pole piece and connected to the other like poles of the magnets, and a coil mechanically coupled to the slider and loosely encircling one of said pole pieces, said coil having its ends connected between the said slider and the variable voltage source such that the voltage generated in the coil in response to movement of the slider has a directional sense opposed to the voltage unbalance between the variable voltage source and the potentiometer output.

2. The invention as recited in claim 1, wherein the lateral spacing between the two pole pieces varies smoothly from a maximum value at the magnets to a minimum value at a point substantially midway between the magnets to maintain a substantially uniform magnetic flux density between the said pole pieces.

References Cited in the file of this patent

UNITED STATES PATENTS

| Number | Name | Date |
|---|---|---|
| 1,757,193 | Hotopp | May 6, 1930 |
| 2,522,240 | Sias | Sept. 12, 1950 |
| 2,581,133 | Niemann | Jan. 1, 1952 |